(12) United States Patent  (10) Patent No.: US 7,930,588 B2
Blount et al.  (45) Date of Patent: Apr. 19, 2011

(54) DEFERRED VOLUME METADATA INVALIDATION

(75) Inventors: Lawrence Carter Blount, Tucson, AZ (US); Lokesh Mohan Gupta, Tucson, AZ (US); Carol Santich Melgren, Tucson, AZ (US); Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/361,009

(22) Filed: Jan. 28, 2009

(65) Prior Publication Data

US 2010/0191925 A1  Jul. 29, 2010

(51) Int. Cl.
*G06F 11/00* (2006.01)

(52) U.S. Cl. ............. 714/21; 714/42; 711/135; 711/136

(58) Field of Classification Search .................. None
See application file for complete search history.

(56) References Cited

U.S. PATENT DOCUMENTS

| | | | |
|---|---|---|---|
| 5,996,088 A | | 11/1999 | Frank et al. |
| 6,658,542 B2 * | | 12/2003 | Beardsley et al. ............ 711/162 |
| 6,732,124 B1 | | 5/2004 | Koseki et al. |
| 6,738,863 B2 * | | 5/2004 | Butterworth et al. ......... 711/114 |
| 6,988,171 B2 * | | 1/2006 | Beardsley et al. ............. 711/144 |
| 7,099,995 B2 * | | 8/2006 | Springer et al. ............... 711/114 |
| 7,340,652 B2 * | | 3/2008 | Jarvis et al. ..................... 714/42 |
| 7,421,535 B2 * | | 9/2008 | Jarvis et al. ................... 711/113 |
| 7,472,312 B2 * | | 12/2008 | Jarvis et al. ..................... 714/42 |
| 2005/0005188 A1 * | | 1/2005 | Hsu et al. ........................... 714/2 |
| 2005/0193230 A1 * | | 9/2005 | Springer et al. ................... 714/5 |

OTHER PUBLICATIONS

Sanjay Ghemawat et al., "The Google File System," ACM 1-58113-757-5/03/0010, 2003, pp. 29-43.
Peter Radkov et al., "A Performance Comparison of NFS and iSCSI for IP-Networked Storage," Proceedings of the Third USENIX Conference on File and Storage Technologies, 2004, 15 pages.
Sage A. Weil, "Ceph: A Scalable, High-Performance Distributed File System," Seventh USENIX Symposium on Operating Systems Design and Implementation, 2006, pp. 307-320.

* cited by examiner

*Primary Examiner* — Christopher S McCarthy
(74) *Attorney, Agent, or Firm* — Griffiths & Seaton PLLC

(57) ABSTRACT

A method, system, and computer program product for managing modified metadata in a storage controller cache pursuant to a recovery action by a processor in communication with a memory device is provided. A count of modified metadata tracks for a storage rank is compared against a predetermined criterion. If the predetermined criterion is met, a storage volume having the storage rank is designated with a metadata invalidation flag to defer metadata invalidation of the modified metadata tracks until after the recovery action is performed.

25 Claims, 6 Drawing Sheets

US 7,930,588 B2

DEFERRED VOLUME METADATA INVALIDATION

BACKGROUND OF THE INVENTION

1. Field of the Invention

The present invention relates in general to computers, and more particularly to a method, system, and computer program product for managing modified metadata in a storage controller cache pursuant to a recovery action by a processor in communication with a memory device.

2. Description of the Related Art

Storage devices such as disks are commonplace in today's society. Devices such as controllers control access to the storage devices in response to read and write requests. The storage controllers also mirror data to different storage devices and spread data amongst different storage devices for redundancy and backup purposes. Storage controllers may store data in accordance with one of several redundant array of independent disk (RAID) security levels. Generally, the higher the RAID level the greater the redundancy of the data storage. Pooled storage devices may be used to increase storage capacity and provide recovery and backup services.

Storage servers, such as an IBM® Enterprise Storage Server® (ESS), are also becoming commonplace. One IBM® ESS storage server includes two clusters of processors and associated hardware. Typically, there are four storage controllers in each cluster. Each of the storage controllers controls multiple storage devices grouped in RAID arrays. In one environment, clients with Fiber Channel Host Bus Adapters ("HBAs") are coupled via a Fiber Channel to a switch. The switch is also coupled to the Storage Server with Fiber Channel HBAs. There may be multiple storage servers per client. Each client is assigned or allocated storage "volumes" which are mapped to physical locations on storage devices that are grouped in RAID arrays. Consequently, clients make data access requests (reads and writes) to the storage server, for data within their allocated volumes, and the storage server accesses the mapped locations in cache storage to satisfy the requests or from disk if the data does not reside in cache storage.

One IBM® ESS comprises two clusters of storage controllers with four storage controllers per cluster. Each cluster has its own cache (semiconductor) memory and non-volatile storage (NVS) which is not shared across the clusters. In addition, each storage controller has its own cache (disk) storage. The cache memory is used for rapid access to data inpaged from external storage to service read data access requests from memory and to provide buffering of modified data. All update requests are written to the associated cluster and backed up by the NVS on the mirrored cluster.

In many storage controllers, such as the storage controllers described above, metadata is retained to describe the location and properties of customer data over which the storage controller is responsible. This metadata may be cached in the cache memory described above for faster performance of the storage controller. In certain situations, all cached modified metadata needs to be destaged to disk before a storage action is complete. Such actions include failback and initialization of metadata. In some of these cases, a large amount of modified metadata may slow destage of associated customer data to disk. These cases may become particularly acute in the event of a storage recovery operation (such as failback), where a large amount of data is moved. In such a recovery operation the original, unmodified metadata (to be replaced by the modified metadata) must be invalidated. Metadata invalidation in these cases may take a longer period of time than is desired. As a result, storage performance may be negatively impacted.

SUMMARY OF THE INVENTION

In view of the foregoing, a need exists for a metadata management mechanism to better address situations, such as data recovery operations, where large quantities of modified metadata must be destaged to disk before a storage action is completed, and where a large quantity of metadata must be invalidated on one or more storage volumes.

Accordingly, in one embodiment, by way of example only, a method for managing modified metadata in a storage controller cache pursuant to a recovery action by a processor in communication with a memory device is provided. A count of modified metadata tracks for a storage rank is compared against a predetermined criterion. If the predetermined criterion is met, a storage volume having the storage rank is designated with a metadata invalidation flag to defer metadata invalidation of the modified metadata tracks until after the recovery action is performed.

In another embodiment, again by way of example only, a system for managing modified metadata in a storage controller cache pursuant to a recovery action by a processor in communication with a memory device is provided. A metadata module is operable by the processor and in communication with the memory device in the storage controller. The metadata module is adapted for comparing a count of modified metadata tracks for a storage rank against a predetermined criterion, and if the predetermined criterion is met, designating a storage volume having the storage rank with a metadata invalidation flag to defer metadata invalidation of the modified metadata tracks until after the recovery action is performed.

In another embodiment, again by way of example only, a computer program product for managing modified metadata in a storage controller cache pursuant to a recovery action by a processor in communication with a memory device is provided. The computer program product comprises a computer-readable storage medium having computer-readable program code portions stored therein. The computer-readable program code portions comprise a first executable portion for comparing a count of modified metadata tracks for a storage rank against a predetermined criterion, and a second executable portion for, if the predetermined criterion is met, designating a storage volume having the storage rank with a metadata invalidation flag to defer metadata invalidation of the modified metadata tracks until after the recovery action is performed.

In another embodiment, again by way of example only, a method for invalidating metadata for a range of tracks in a data storage volume by a processor in communication with a memory device is provided. The metadata for the range of tracks is compared against a predetermined criterion for asynchronous volume metadata invalidation. If the predetermined criterion is met, a task control block (TCB) is allocated to update a global status for the data storage volume. The TCB designates the data storage volume with a metadata invalidation flag. A success message is returned to a client in communication with the data storage volume upon completion of updating the global status. The metadata for the range of tracks is asynchronously invalidated as a background process.

In another embodiment, again by way of example only, a system for invalidating metadata for a range of tracks in a data storage volume by a processor in communication with a memory device is provided. A metadata module is operable by the processor and in communication with the memory device. The metadata module is adapted for comparing the metadata for the range of tracks against a predetermined criterion for asynchronous volume metadata invalidation, and if the predetermined criterion is met, allocating a task control block (TCB) to update a global status for the data storage volume. The TCB designates the data storage volume with a metadata invalidation flag. The metadata module is further adapted for returning a success message to a client in communication with the data storage volume upon completion of updating the global status, and asynchronously invalidating the metadata for the range of tracks as a background process.

In still another embodiment, again by way of example only, a computer program product for invalidating metadata for a range of tracks in a data storage volume by a processor in communication with a memory device is provided. The computer program product comprises a computer-readable storage medium having computer-readable program code portions stored therein. The computer-readable program code portions comprise a first executable portion for comparing the metadata for the range of tracks against a predetermined criterion for asynchronous volume metadata invalidation, and a second executable portion for, if the predetermined criterion is met, allocating a task control block (TCB) to update a global status for the data storage volume. The TCB designates the data storage volume with a metadata invalidation flag. The computer-readable program code portions further comprise a third executable portion for returning a success message to a client in communication with the data storage volume upon completion of updating the global status, and a fourth executable portion for asynchronously invalidates the metadata for the range of tracks as a background process.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for managing large quantities of modified metadata for destage so as to limit or eliminate negative storage performance. These embodiments include use of a metadata invalidation flag. The metadata invalidation flag acts to designate volumes and tracks with metadata to be invalidated, so as to defer metadata invalidation until more computing resources are available. Throughout this description and appended claims, reference is made to a "recovery" action. Recovery action is intended to refer to any number of scenarios where a large quantity of modified metadata accumulates for destage. As such, the term "recovery action" may not even refer to a storage recovery per se, but to any scenario where a large quantity of modified metadata must be managed by the storage controller.

The illustrated embodiments monitor modified metadata for each storage rank. If the amount of modified metadata for a particular storage rank meets a predetermined criterion, remaining metadata tracks for the rank are discarded, and associated storage volumes are marked with the metadata invalidation flag to invalidate metadata for the volume. Once a recovery action is complete, metadata for all volumes having the metadata invalidation flag set is invalidated, and the flag is reset when the invalidate is complete. Metadata access in the storage controller cache for volumes with the metadata invalidation flag is changed so that the metadata is rebuilt on demand. Access to this metadata is provided in this manner, without waiting for all metadata invalidation to complete.

In situations where a large quantity of metadata needs to be invalidated on a particular volume or volumes, the effected volumes may be designated with the metadata invalidation flag. Metadata invalidation may then proceed asynchronously, alleviating the need to hold resources and processes until the volume invalidation is complete. In this way, metadata management and invalidation proceeds without encumbering resources or slowing access to data, improving storage performance.

Additional terminology, following, is described herein with reference to the present invention. The term "cache metadata" may refer to data describing the location and property of customer data. The data is cached along with the customer data to improve performance. Cache metadata may be constructed by examining customer data. The terms "invalidation" or "metadata invalidation" may refer to the process of invalidating the metadata, as one or more properties/locations of the customer data has changed. Finally, the term "global status" may refer to a persistent area to store a state of a storage controller, including a state of the storage volumes associated with the storage controller.

Figure 1:
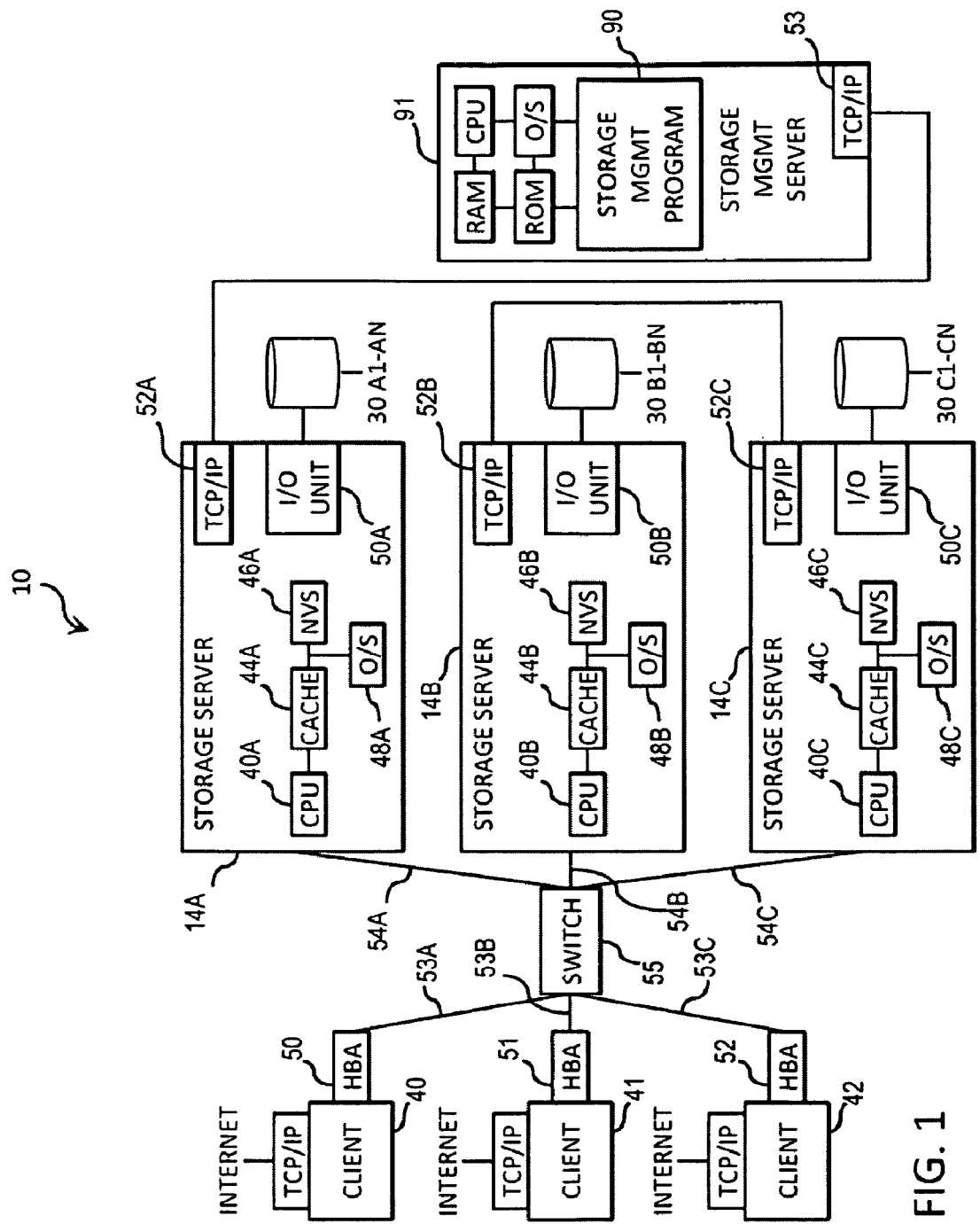
FIG. 1 is a block diagram of a distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers 14 $a,b,c$ with respective CPU 40 $a,b,c$, cache 44 $a,b,c$, nonvolatile storage ("NVS") 46 $a,b,c$, operating system 48 $a,b,c$, I/O unit 50 $a,b,c$, and TCP/IP adapter card 52 $a,b,c$. Each of the storage servers 14 $a,b,c$ manages storage allocation and access to multiple storage devices (such as disks) 30$a$1-$an$, 30$b$1-$bn$, and 30 $c$1-$cn$, respectively, by clients 40, 41 and 42. Clients 40, 41 and 42 have adapter cards 50, 51 and 52, such as a Fibre Channel adapter cards, for connection via a communication path 53 *a,b,c*, such as a Fibre Channel, to a switch 55. Switch 55 can be coupled to storage servers 14 *a,b,c* via host busses 54 *a,b,c*, and can forward a request from any of the clients 40, 41 or 42 to any of the storage servers 14, *a,b,c* as configured on the client. An administrator has allocated to each of the clients 40, 41 and 42 a number of storage "volumes". Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
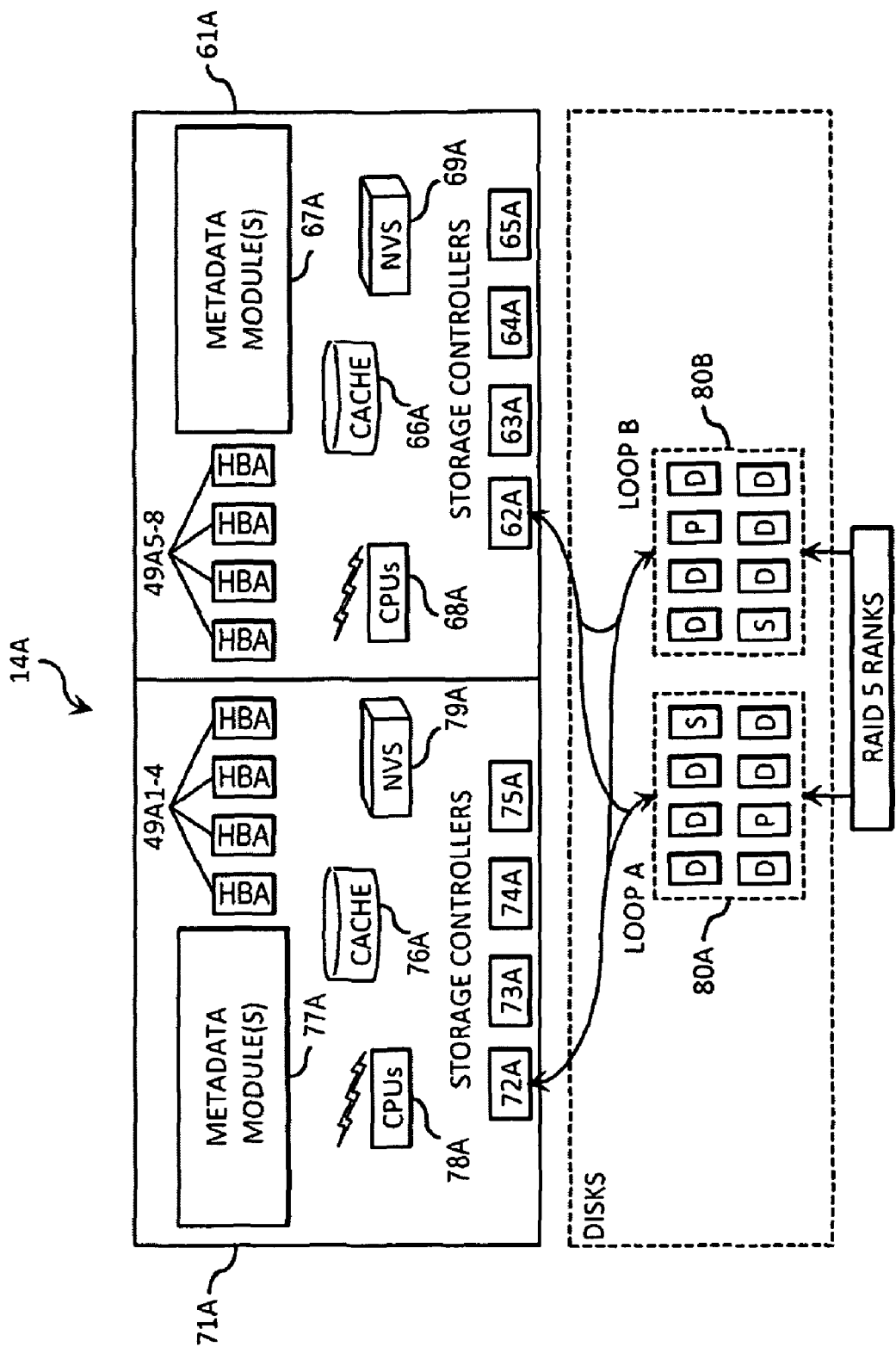
FIG. 2 is a block diagram of one of the storage servers of FIG. 1.

In the exemplary embodiment illustrated in FIG. 2, storage server 14*a* (and likewise storage servers 14*b* and *c*) includes two identical clusters 61*a* and 71*a* of CPUs 68*a* and 78*a*, cache 66*a* and 76*a*, NVS 69*a* and 79*a*, and storage controllers 62*a*-65*a* and 72*a*-75*a*, with four storage respective controllers 62*a*-65*a* and 72*a*-75*a* per cluster. There is a shared cache (semiconductor) memory 66*a* and 76*a* for each cluster 61*a* and 71*a*, respectively. Each cluster also contains battery backed-up storage 66*b* and 76*b* (also called "NVS"). The cache 66*a* and 76*a* and NVS memory 69*a* and 79*a* are not shared across the clusters 61*a* and 71*a*. In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays. When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14 *a,b,c* via a SAN network. Alternately, there can be a separate instance of module 90 executing on each storage server 14 *a,b,c* and communicating with the other instances of program 90 on the other storage servers via a TCP/IP network. The skilled artisan will appreciate that a variety of implementations of SMP module in communication with the overall storage subsystem are contemplated.

Referring again to FIG. 2, server 14*a* is shown including two metadata modules 67*a* and 77*a*, one for each cluster. Metadata modules 67*a* and 77*a* may be adapted to perform functionality according to the present invention, as will be further described, following. While metadata modules 67*a* and 77*a* are shown incorporated into clusters 61*a* and 71*a*, the skilled artisan will appreciate that the metadata modules 67*a* and 77*a* may be physically located elsewhere, yet remain in communication with the depicted storage controllers, cache memory, etc. Metadata modules 67*a* and 77*a* may be adapted for maintaining a count of modified metadata to be destaged following a recovery operation, for example. The metadata modules 67*a* and 77*a* may compare the count against a predetermined criterion, and may designate tracks and volumes with the metadata invalidation flag. This and further functionality will be further described, below.

Various mechanisms for managing modified metadata in scenarios where a large quantity of metadata accumulate (again, herein referred to as recovery action) are now described. In one embodiment, the metadata module, in cooperation with cache memory, selects one modified metadata track using a least recently used (LRU) methodology. The storage volume associated with the track is examined to determine if it has been marked with the metadata invalidation flag. If so, the track is discarded, and the metadata module moves to the next modified track on the LRU list.

If the following selection of an additional modified metadata track on the LRU list reveals that the metadata invalidation flag not to be set, the metadata module then determines the storage rank to which the metadata track selected previously belongs. It then increments a count of metadata destages in progress for this rank during the recovery action.

As a next step, the count of modified metadata described previously is compared against a predetermined criterion. As the skilled artisan will appreciate, a wide variety of predetermined criterion may exist. For example, one predetermined criterion may be that the modified metadata meets or exceeds a certain number. An additional predetermined criterion may be that the count exceeds a predetermined threshold for an amount of metadata tracks that may be scheduled for destage.

If the selected track meets the predetermined criterion, then the volume to which the track belongs is designated with the metadata invalidation flag, and the modified metadata track is discarded. Designation of tracks with the metadata invalidation flag serves to defer invalidation of the metadata until after the recover action has been performed.

If the predetermined criterion is not met, then the selected track is marked for destage, and the process of selecting tracks continues until all modified metadata has been appropriately handled.

Figure 3:
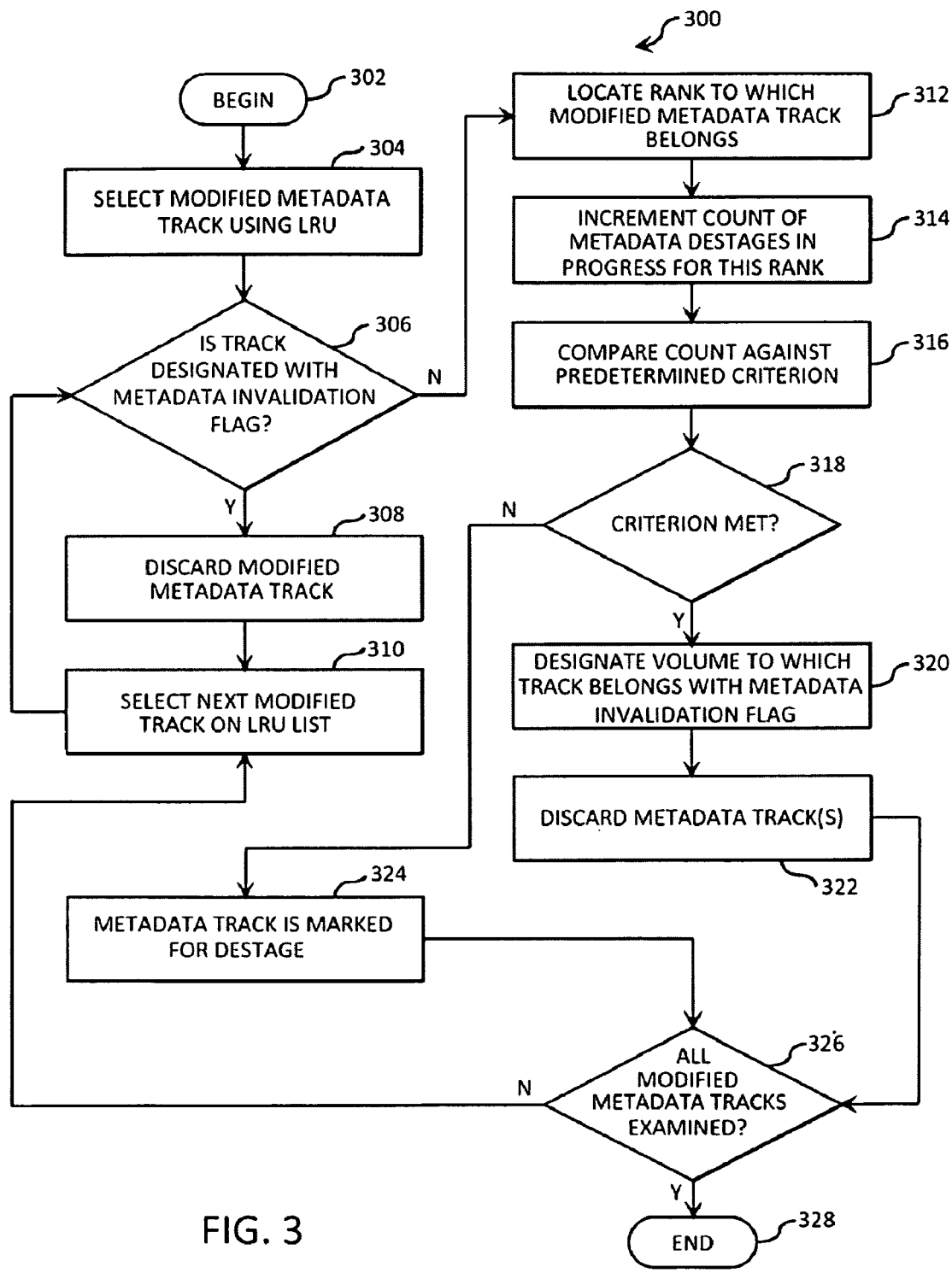
FIG. 3 is a flow chart of an exemplary method for managing modified metadata pursuant to a recovery operation.
Figure 4:
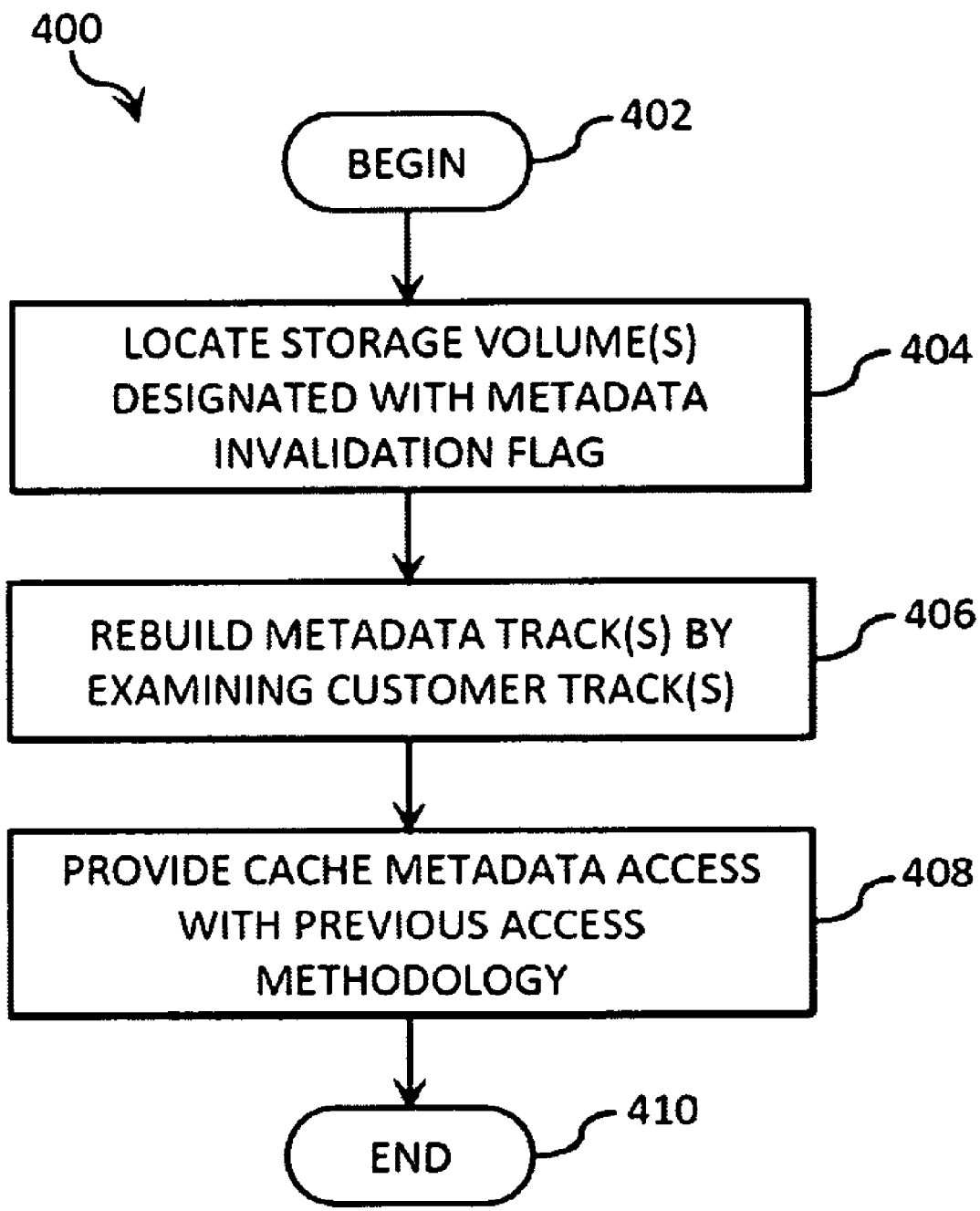
FIG. 4 is a flow chart of an exemplary method for cache metadata access pursuant to the exemplary method depicted in FIG. 3.
Figure 5:
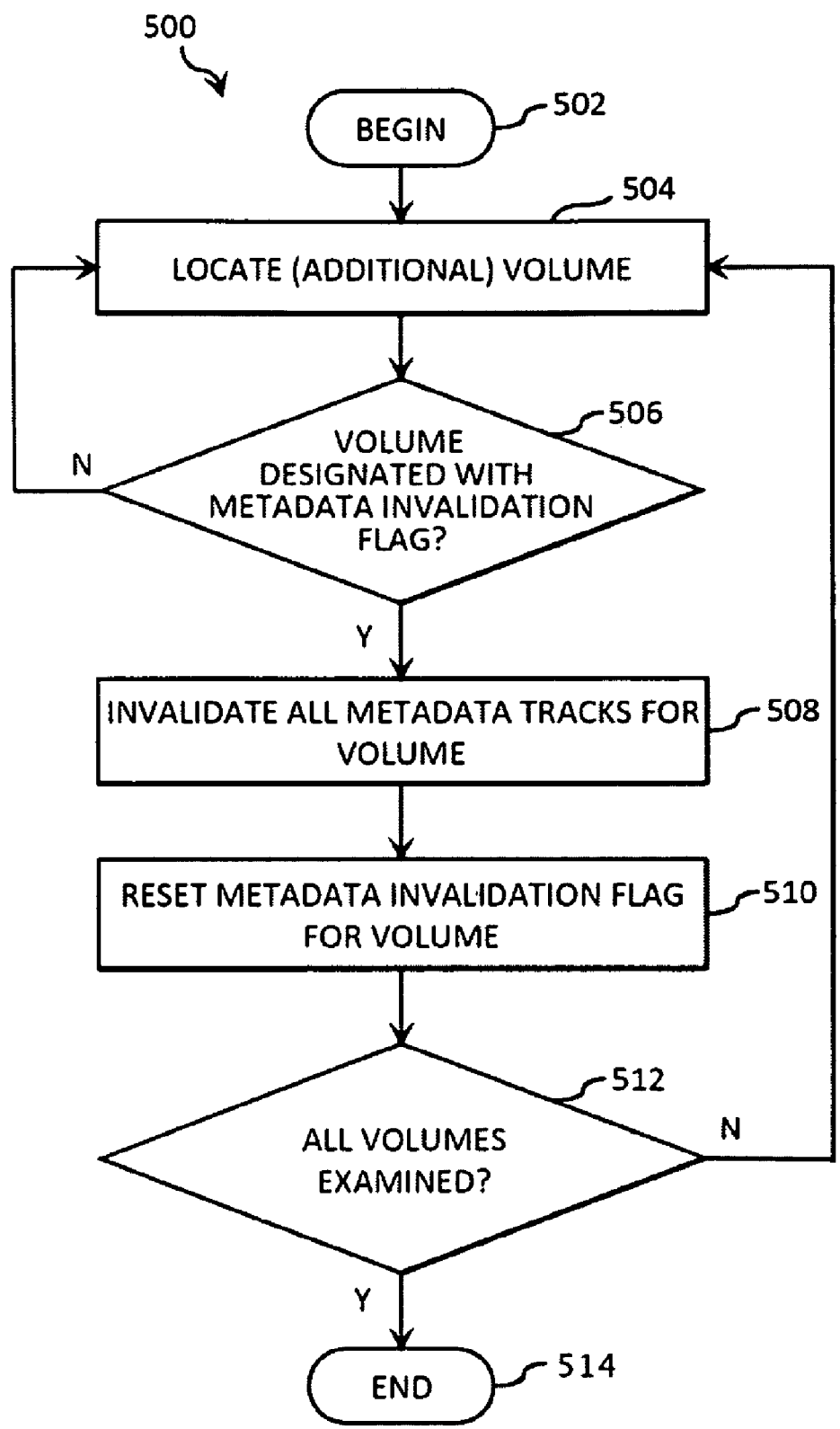
FIG. 5 is a flow chart of an exemplary method for cache metadata invalidation following the recovery action in FIG. 3.
Figure 6:
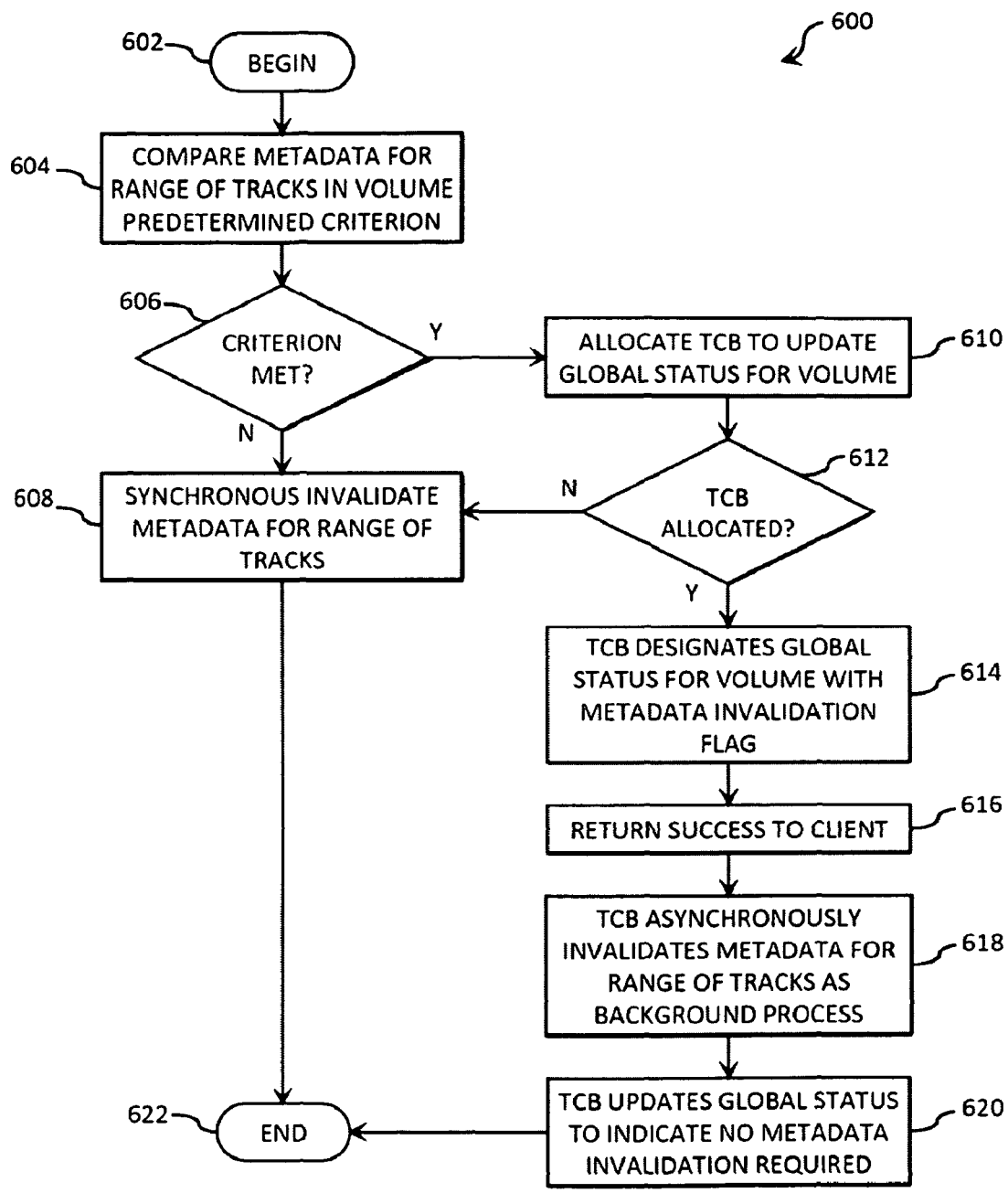
FIG. 6 is a flow chart of an exemplary method for managing metadata invalidation for a range of tracks.

FIGS. 3 and 4, following, illustrate exemplary methods for managing modified metadata and configuring cache metadata access pursuant to a recovery process. FIGS. 5 and 6, following, illustrate exemplary methods for invalidating metadata for a range of tracks on one or more storage volumes and configuring cache metadata access accordingly. As one skilled in the art will appreciate, various steps in the methods 300-600 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning to FIG. 3, an exemplary method 300 for managing metadata pursuant to a recovery action according to the present invention is illustrated. Method 300 begins (step 302) with the selection of a modified metadata track using the LRU methodology as previously described (step 304). If the track is designated with the metadata invalidation flag (step 306), then the track is discarded (step 308), and the next track on the LRU list is selected (step 310). The process of selecting a particular track, examining the track, and discarding the track continues until a modified metadata track not having a set metadata invalidation flag is obtained.

Once a modified metadata track not having a set metadata invalidation flag is obtained, control moves to step 312, where the rank to which the obtained track belongs is located. The count of metadata destages in progress for the selected rank is incremented (step 314), and the count is compared against the predetermined criterion (step 316), such as whether the count has exceeded a threshold amount for metadata tracks scheduled for destage. If the criterion is met (step 318), then the volume to which the track belongs is designated with the metadata invalidation flag (step 320) and discarded (step 322). If the criterion is not met (again, step 318), then the metadata track is marked for destage (step 324). If additional modified metadata tracks remain to be examined (step 326), then control again moves to step 310, and the method 300 continues as previously. If every modified metadata track has examined (again, step 326), then the method 300 ends (step 328).

Turning to FIG. 4, an exemplary method 400 for configuring cache metadata access to be consistent with the metadata management mechanism depicted previously in FIG. 3 is shown. Method 400 begins (step 402) with the location of one or more storage volumes for which cache metadata access is requested. The storage volume(s) is examined to determine if the metadata invalidation flag is set. Method 400 assumes that, for the located file, the metadata invalidation flag is so designated (step 404). For located volumes designated with the metadata invalidation flag, the metadata track(s) are then rebuilt by examining customer tracks (associated data) (step 406). As a succeeding step, the cache metadata access is then provided with the cache metadata access methodology previously used (prior to implementation of the metadata invalidation flag) (step 408). The method 400 then ends (step 410).

Turning now to FIG. 5, an exemplary method 500 for cache metadata invalidation following the recovery action shown in FIG. 3 is illustrated. Method 500 begins (step 502) with the location and examination of a particular storage volume (step 504). If the volume is designated with the metadata invalidation flag (step 506), then all metadata tracks for the volume are invalidated (step 508), and the metadata invalidation flag for the volume is reset (step 510) to indicate that the metadata has been invalidated. The process continues for each storage volume supervised by the storage controller. If all volumes are examined (step 512), then the method 500 ends (step 514).

In certain scenarios, such as the steps described above, metadata for a large part of a particular storage volume must be invalidated. Additional scenarios include Clear Status Tracks (CST) operations, Flash Copy Withdraw (FCW) operations, and similar operations. To perform such invalidation, a long period of time may be expended. To facilitate such invalidation without encumbering system resources, such as holding up system processes, a mechanism may be implemented as described, following.

Storage volumes in a persistent state having a large amount of metadata to be invalidated may be designated with the metadata invalidation flag, and a success message may be returned to the client. Later, the metadata invalidation may proceed asynchronously for the volume. Once the metadata invalidation is complete, the persistent state of the storage volume is restored. Any cache metadata access during the period of time in which the volume is designated with the metadata invalidation flag (indicating metadata invalidation is required for the volume) will rebuild the metadata by examining associated customer data.

In one embodiment, during such a volume metadata invalidation request, a metadata module in cooperation with cache memory examines the request to determine if the invalidation meets a predetermined criterion for asynchronously invalidating metadata for the volume. Here, as before, the predetermined criterion may vary, as the skilled artisan will appreciate. For example, the predetermined criterion may include facts to indicate that the invalidation requested is greater than a certain percentage (e.g., 50%) of the volume. An additional predetermined criterion may be that the range of invalidation (requested for a range of metadata tracks) exceeds a predetermined threshold. Again, the skilled artisan will appreciate that a variety of criteria may be established.

If the invalidation to be performed does not meet the predetermined criterion, then invalidation is performed synchronously as before. If the invalidation does meet the predefined criterion, then the volume is persistently designated with the metadata invalidation flag, and success is returned to the client. A new background process is then commenced to invalidate metadata for the volume asynchronously. Once the metadata invalidation is complete, the persistent state of the volume is restored.

Turning to FIG. 6, an exemplary method 600 for invalidating metadata for a range of tracks for one or more storage volumes is depicted. Method 600 begins (step 602) with the comparison of the metadata for the range of tracks to determine if the metadata to be invalidated meet a predetermined criterion for asynchronous metadata invalidation (step 604).

If the predetermined criterion is not met (step 606), then the metadata is synchronously invalidated as described previously (step 608), and the method 600 ends (step 622). If the predetermined criterion is met (again, step 606), then a TCB is allocated to update global status for the volume (step 610). If a TCB cannot be allocated (step 612), then the metadata is again synchronously invalidated (again, step 608), and the method 600 then ends (again, step 622).

If a TCB is allocable, then it is utilized to designate global status for the volume with a metadata invalidation flag (step 614), and success is returned to the client (step 616). The new TCB then invalidates the metadata for the range of tracks as a background process (step 618). Once the metadata invalidation is completed, the new TCB updates global status for the volume to reflect that no metadata invalidation is required (the metadata invalidation flag is removed) (step 620). The method 600 then ends (again, step 622).

For purposes of large-scale metadata invalidation on storage volumes, modifications to cache metadata access as previously described in FIG. 4 and modifications to cache metadata invalidation following a recovery action as previously described in FIG. 5 remain in effect. That is, for example in the case of invalidation following a recovery action as shown in FIG. 5, the processes described are performed (e.g., invalidation occurs for all volumes designated with the volume invalidation flag). As a result, the steps depicted in FIGS. 5 and 6 are applicable to both cases of cache metadata management as described in FIG. 3 and large-scale metadata invalidation as described in FIG. 6.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing modified metadata in a storage controller cache pursuant to a recovery action by a processor in communication with a memory device, comprising:
    comparing a count of modified metadata tracks for a storage rank against a predetermined criterion; and
    if the predetermined criterion is met, designating a storage volume having the storage rank with a metadata invalidation flag to defer metadata invalidation of the modified metadata tracks until after the recovery action is performed.

2. The method of claim 1, further including:
    examining one of the modified metadata tracks according to a least recently used (LRU) order,
    if the metadata invalidation flag is not designated for the storage volume, incrementing the count of modified metadata tracks, and
    if the metadata invalidation flag is designated for the storage volume, discarding the one of the modified metadata tracks.

3. The method of claim 2, further including:
    locating one of the storage volume and additional storage volumes for which cache metadata access is requested, and
    if the one of the storage volume and the additional storage volumes is designated with the metadata invalidation flag, rebuilding at least one of the modified metadata tracks and additional modified metadata tracks corresponding to the one of the storage volume and the additional storage volumes by examining at least one customer track.

4. The method of claim 2, further including, subsequent to performing the recovery action:
    locating at least one of the storage volume and additional storage volumes designated with the metadata invalidation flag,
    invalidating each of the modified metadata tracks on the at least one of the storage volume and the additional storage volumes, and
    resetting the metadata invalidation flag for the at least one of the storage volume and the additional storage volumes.

5. A system for managing modified metadata in a storage controller cache pursuant to a recovery action by a processor in communication with a memory device, comprising:
    a metadata module operable by the processor and in communication with the memory device in the storage controller, wherein the metadata module is adapted for:
        comparing a count of modified metadata tracks for a storage rank against a predetermined criterion, and
        if the predetermined criterion is met, designating a storage volume having the storage rank with a metadata invalidation flag to defer metadata invalidation of the modified metadata tracks until after the recovery action is performed.

6. The system of claim 5, wherein the metadata module is further adapted for:
    examining one of the modified metadata tracks according to a least recently used (LRU) order,
    if the metadata invalidation flag is not designated for the storage volume, incrementing the count of modified metadata tracks, and
    if the metadata invalidation flag is designated for the storage volume, discarding the one of the modified metadata tracks.

7. The system of claim 5, wherein the metadata module is further adapted for:
    locating one of the storage volume and additional storage volumes for which cache metadata access is requested, and
    if the one of the storage volume and the additional storage volumes is designated with the metadata invalidation flag, rebuilding at least one of the modified metadata tracks and additional modified metadata tracks corresponding to the one of the storage volume and the additional storage volumes by examining at least one customer track.

8. The system of claim 5, wherein the metadata module is further adapted for, subsequent to performing the recovery action:
    locating at least one of the storage volume and additional storage volumes designated with the metadata invalidation flag,
    invalidating each of the modified metadata tracks on the at least one of the storage volume and the additional storage volumes, and
    resetting the metadata invalidation flag for the at least one of the storage volume and the additional storage volumes.

9. A computer program product for managing modified metadata in a storage controller cache pursuant to a recovery action by a processor in communication with a memory device, the computer program product comprising a computer-readable storage medium having computer-readable program code portions stored therein, the computer-readable program code portions comprising:
    a first executable portion for comparing a count of modified metadata tracks for a storage rank against a predetermined criterion; and
    a second executable portion for, if the predetermined criterion is met, designating a storage volume having the storage rank with a metadata invalidation flag to defer metadata invalidation of the modified metadata tracks until after the recovery action is performed.

10. The computer program product of claim 9, further including a third executable portion for:
    examining one of the modified metadata tracks according to a least recently used (LRU) order, if the metadata invalidation flag is not designated for the storage volume, incrementing the count of modified metadata tracks, and if the metadata invalidation flag is designated for the storage volume, discarding the one of the modified metadata tracks.

11. The computer program product of claim 9, further including a third executable portion for:

locating one of the storage volume and additional storage volumes for which cache metadata access is requested, and if the one of the storage volume and the additional storage volumes is designated with the metadata invalidation flag, rebuilding at least one of the modified metadata tracks and additional modified metadata tracks corresponding to the one of the storage volume and the additional storage volumes by examining at least one customer track.

12. The computer program product of claim 9, further including a third executable portion for, subsequent to performing the recovery action:

locating at least one of the storage volume and additional storage volumes designated with the metadata invalidation flag, invalidating each of the modified metadata tracks on the at least one of the storage volume and the additional storage volumes, and resetting the metadata invalidation flag for the at least one of the storage volume and the additional storage volumes.

13. A method for invalidating metadata for a range of tracks in a data storage volume by a processor in communication with a memory device, comprising:

comparing the metadata for the range of tracks against a predetermined criterion for asynchronous volume metadata invalidation;

if the predetermined criterion is met, allocating a task control block (TCB) to update a global status for the data storage volume, wherein the TCB designates the data storage volume with a metadata invalidation flag;

returning a success message to a client in communication with the data storage volume upon completion of updating the global status; and asynchronously invalidating the metadata for the range of tracks as a background process.

14. The method of claim 13, further including, subsequent to invalidating the metadata for the range of tracks as the background process, updating the global status to indicate no metadata invalidation is required.

15. The method of claim 13, further including, if the predetermined criterion is not met, synchronously invalidating the metadata for the range of tracks.

16. The method of claim 13, further including, pursuant to a cache metadata access request:

locating one of the data storage volume and additional data storage volumes for which cache metadata access is requested, and if the one of the data storage volume and the additional data storage volumes is designated with the metadata invalidation flag, rebuilding at least one metadata track corresponding to the one of the data storage volume and the additional data storage volumes by examining at least one customer track.

17. The method of claim 13, further including, following a recovery action:

locating one of the data storage volume and additional data storage volumes designated with the metadata invalidation flag, invalidating each metadata track on the one of the data storage volume and the additional storage volumes, and resetting the metadata invalidation flag for the one of the data storage volume and the additional storage volumes.

18. A system for invalidating metadata for a range of tracks in a data storage volume by a processor in communication with a memory device, comprising:

a metadata module operable by the processor and in communication with the memory device, wherein the metadata module is adapted for:

comparing the metadata for the range of tracks against a predetermined criterion for asynchronous volume metadata invalidation, if the predetermined criterion is met, allocating a task control block (TCB) to update a global status for the data storage volume, wherein the TCB designates the data storage volume with a metadata invalidation flag, returning a success message to a client in communication with the data storage volume upon completion of updating the global status, and asynchronously invalidates the metadata for the range of tracks as a background process.

19. The system of claim 18, wherein the metadata module is further adapted for, subsequent to invalidating the metadata for the range of tracks as the background process, updating the global status to indicate no metadata invalidation is required.

20. The system of claim 18, wherein the metadata module is further adapted for, if the predetermined criterion is not met, synchronously invalidating the metadata for the range of tracks.

21. The system of claim 18, wherein the metadata module is further adapted for, pursuant to a cache metadata access request:

locating one of the data storage volume and additional data storage volumes for which cache metadata access is requested, and if the one of the data storage volume and the additional data storage volumes is designated with the metadata invalidation flag, rebuilding at least one metadata track corresponding to the one of the data storage volume and the additional data storage volumes by examining at least one customer track.

22. The system of claim 18, wherein the metadata module is further adapted for, following a recovery action:

locating one of the data storage volume and additional data storage volumes designated with the metadata invalidation flag, invalidating each metadata track on the one of the data storage volume and the additional storage volumes, and resetting the metadata invalidation flag for the one of the data storage volume and the additional storage volumes.

23. A computer program product for invalidating metadata for a range of tracks in a data storage volume by a processor in communication with a memory device, the computer program product comprising a computer-readable storage medium having computer-readable program code portions stored therein, the computer-readable program code portions comprising:

a first executable portion for comparing the metadata for the range of tracks against a predetermined criterion for asynchronous volume metadata invalidation;

a second executable portion for, if the predetermined criterion is met, allocating a task control block (TCB) to update a global status for the data storage volume, wherein the TCB designates the data storage volume with a metadata invalidation flag;

a third executable portion for returning a success message to a client in communication with the data storage volume upon completion of updating the global status; and a fourth executable portion for asynchronously invalidating the metadata for the range of tracks as a background process.

24. The computer program product of claim 23, further including a fifth executable portion for, subsequent to invalidating the metadata for the range of tracks as the background process, updating the global status to indicate no metadata invalidation is required.

25. The computer program product of claim 23, further including a fifth executable portion for, if the predetermined criterion is not met, synchronously invalidating the metadata for the range of tracks.

* * * * *